United States Patent [19]

Ward et al.

[11] 4,296,878
[45] Oct. 27, 1981

[54] SURFBOARD CARRIER

[76] Inventors: Franklin D. Ward; Rock A. Engeman, both of 5582 Kern, Huntington Beach, Calif. 92649

[21] Appl. No.: 46,989

[22] Filed: Jun. 8, 1979

[51] Int. Cl.³ .............................................. B62J 7/00
[52] U.S. Cl. ................................... 224/32 A; 224/39
[58] Field of Search ............... 224/30 R, 30 A, 32 R, 224/32 A, 36, 39 R, 40, 41, 42.11, 42.45 R

[56] References Cited

U.S. PATENT DOCUMENTS

| | | | |
|---|---|---|---|
| 613,226 | 11/1898 | Adams | 224/30 A |
| 3,286,891 | 11/1966 | Jones, Jr. | 224/39 R |
| 3,329,323 | 7/1967 | Tanaka | 224/41 |
| 3,338,484 | 8/1967 | Hall, Sr. | 224/41 |
| 3,495,749 | 2/1970 | Meadowcroft | 224/39 R |
| 3,547,325 | 12/1970 | Hill et al. | 224/39 R |
| 3,659,761 | 5/1972 | Wesson | 224/39 R |
| 3,827,613 | 8/1974 | Meyer | 224/32 A |
| 3,907,183 | 9/1975 | Shearer, Sr. et al. | 224/32 R |

FOREIGN PATENT DOCUMENTS

| | | | |
|---|---|---|---|
| 183326 | 9/1955 | Fed. Rep. of Germany | 224/39 R |
| 278189 | 10/1927 | United Kingdom | 224/39 R |

*Primary Examiner*—Robert J. Spar
*Assistant Examiner*—Kenneth Noland
*Attorney, Agent, or Firm*—Nilsson, Robbins, Dalgarn, Berliner, Carson & Wurst

[57] ABSTRACT

A surfboard carrier for a bicycle has a first and a second U-shaped member vertically positioned relative to the bicycle and opening toward the bicycle, each being attached at lower and upper positions on opposite sides of the rear wheel of the bicycle. A pair of lower cross members are connected between the U-shaped members for defining a lower rectangular retention region into which the surfboard nose is positioned. An upper cross member, forward of the lower cross members, is connected between the U-shaped members for defining an upper, horizontal U-shaped retention region. Polyurethane foam is attached about the periphery of the upper and lower retention regions for preventing back-and-forth and side-to-side movement of the board when it is in position nose end down and rear end tilted forward toward the bicycle.

4 Claims, 5 Drawing Figures

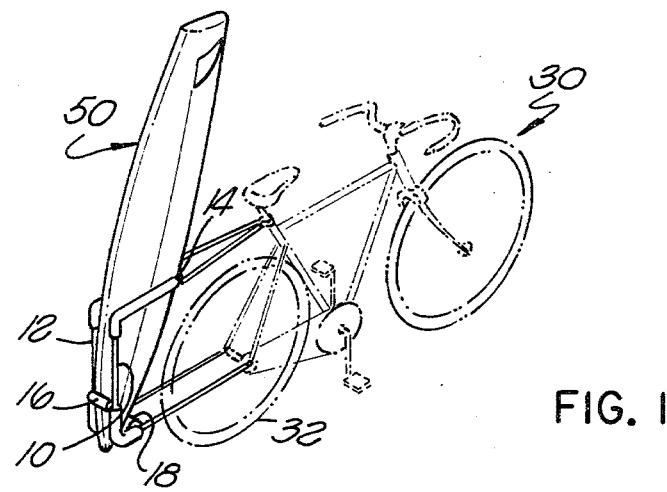
FIG. 1
FIG. 2
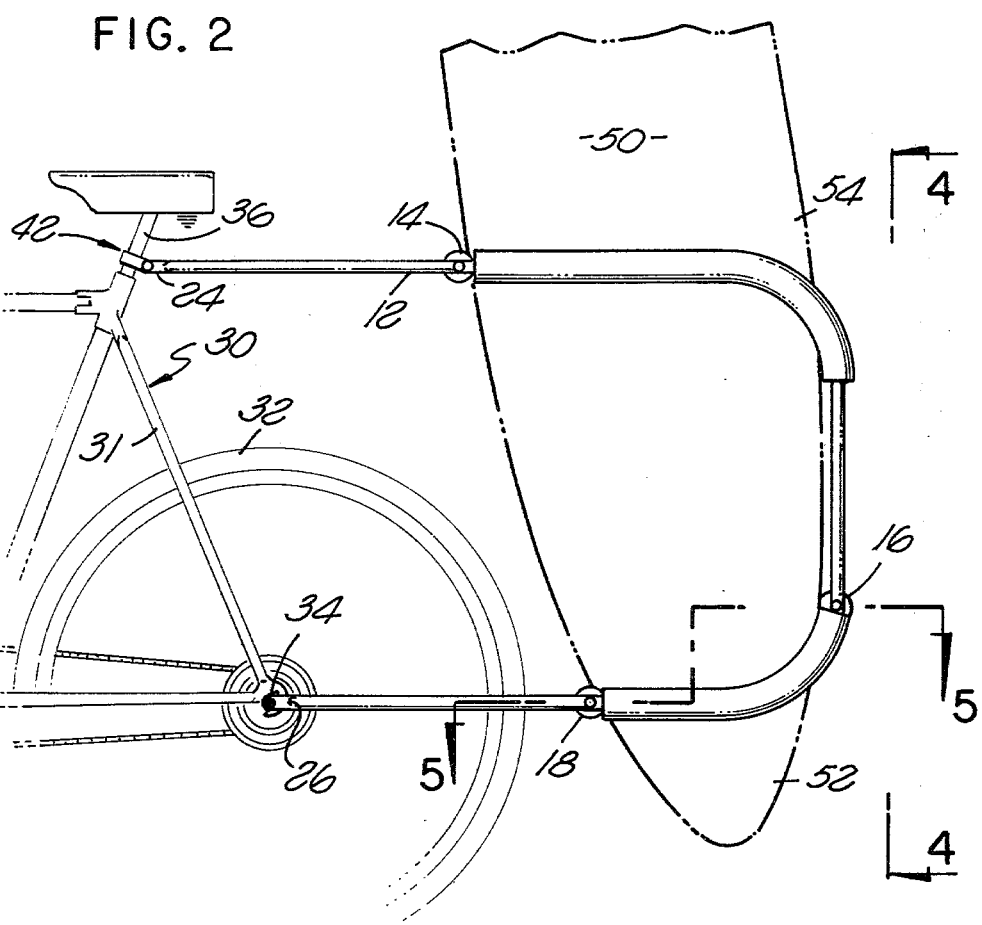

SURFBOARD CARRIER

BACKGROUND OF THE INVENTION

The present invention relates to carrier apparatus for bicycles and, in particular, to a surfboard carrier for a bicycle or motor driven cycle.

Various types of carriers for surfboards are known in the art. For example, in U.S. Pat. No. 3,329,323, filed Oct. 15, 1965; U.S. Pat. No. 3,338,484, filed Jan. 28, 1966, and U.S. Pat. No. 3,547,325, filed Aug. 9, 1968, various types of overhead carrier apparatus are disclosed. However, such overhead carrier apparatus unbalance the two wheel vehicle. In addition, it is generally necessary to lean the bicycle sideways in order to attach the surfboard to the carrier thereafter requiring the bicycle rider to expend a substantial amount of effort to lift the bicycle with the board attached.

In U.S. Pat. No. 3,659,761, filed Oct. 13, 1970, a surfboard carrier rack is disclosed with fore and aft brackets which extend from one side of the bicycle. While this type of side mounted carrier eliminates certain unbalancing effects of the overhead carriers, this carrier has a tendency to cause the bicycle to tip to one side and can adversely affect the rider's ability to turn and pedal.

The present invention provides a novel surfboard carrier for bicycles or other two wheeled vehicles which substantially reduces or eliminates the unbalancing effect of prior art surfboard carrying devices by providing a lower rectangular retention means which is mounted in the longitudinal plane to the rear of the bicycle, and an upper, U-shaped, retention means which is generally forward of the lower retention means. In operation, the nose of the surfboard is inserted, nose down, into the lower retention means with the nose being held above the ground. The surfboard is then pushed forward into the U-shaped retention means with the rear or skag end of the surfboard pointed upwardly and tilted forward towards the bicycle. The forward tilting has the effect of shifting the center of gravity of the surfboard to a point generally over the rear wheel of the bicycle.

A resilient material, such as a polyurethane foam, is then provided to cover the upper and lower retention means to hold the surfboard substantially immovable side-to-side and back-and-forth and to protect the board from being damaged by the hard surfaces of the upper and lower retention means.

SUMMARY OF THE INVENTION

A surfboard carrier for bicycles in accordance with the present invention comprises a lower retention means defining a lower enclosed generally rectangular retention region, and a lower attachment means for interconnecting the lower retention means rearward of the bicycle. The surfboard carrier further comprises an upper retention means defining an upper generally U-shaped retention region opening away from the bicycle and an upper attachment means for interconnecting the upper retention means to the bicycle. The upper retention means is preferably positioned forward of the lower retention means with the upper and lower retention regions aligned for receiving a surfboard nose portion in the lower retention region and a surfboard center portion in the upper retention region for tilting the surfboard forward towards the bicycle.

An elastomeric holding means is attached to and about the upper and lower retention means for pressing against and holding the surfboard substantially immovable relative to the surfboard carrier and for protecting the surfboard from being damaged by movement during transport. In the preferred embodiment, the length of the lower retention region is less than the width of the surfboard at a selected distance from the nose of the surfboard for holding the nose of the surfboard above the ground. Furthermore, in the preferred embodiment, the width of the upper and lower retention regions between the upper and the lower retention means respectively without the polyurethane foam is greater than the width of the surfboard while the width of the upper and lower retention regions between the upper and lower retention means with the elastomeric holding means in place being less than the width of the surfboard. Thus, when the surfboard is positioned in the surfboard carrier, the elastomeric means is compressed and the board held in place and prevented from substantial side-to-side movement.

BRIEF DESCRIPTION OF THE DRAWINGS

A complete understanding of the present invention and of the above and other objects and advantages thereof may be gained from a consideration of the following description of the preferred embodiments taken in conjunction with the accompanying drawings in which:

FIG. 1 is a partial view of a preferred embodiment of the invention attached to a bicycle with a surfboard in position;

FIG. 2 is a side view of a surfboard carrier in accordance with the invention;

DETAILED DESCRIPTION

Figure 3:
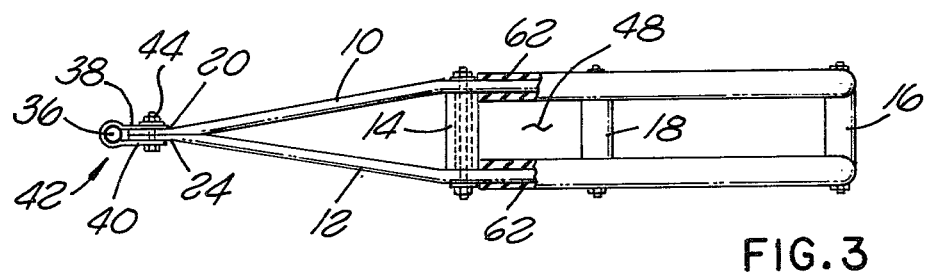
FIG. 3 is a top partially cut-away view of a surfboard carrier in accordance with the invention.
Figure 4:
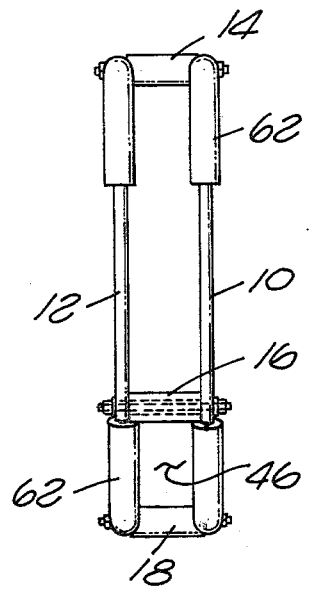
FIG. 4 is a rear view of the surfboard carrier through section 4—4 of FIG. 2.

Referring to FIGS. 1-5, the present invention comprises a first generally U-shaped member 10 and a second generally U-shaped member 12 connected together by an upper cross member or spacer 14 and a first lower cross member 16 and a second lower cross member 18. The cross members or spacers 14, 16 and 18 may be welded between the U-shaped members 10 and 12 or may comprise an interior spacer tube, such as the interior spacer tube 60 shown in FIG. 5, with a bolt, such as the bolt 63, provided to pass through oppositely disposed holes through the U-shaped members 10 and 12 and through the center of the spacer tube 60. A nut, such as the nut 64, is then provided to secure the apparatus between the respective U-shaped members 10 and 12.

Figure 5:
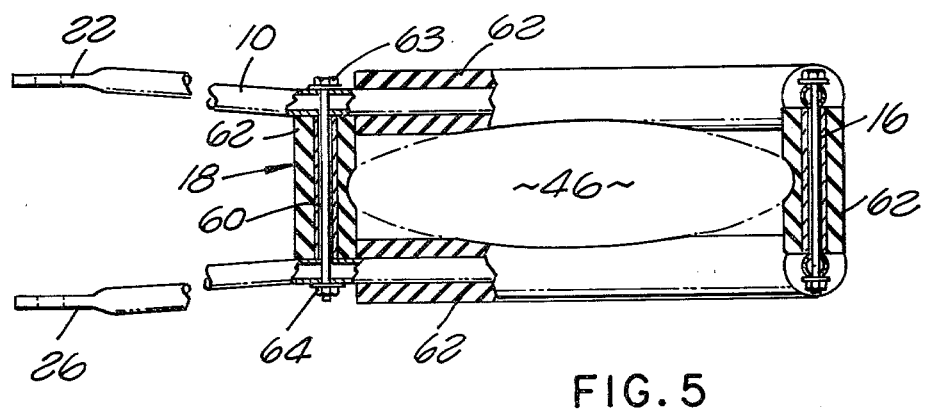
FIG. 5 is a top view of the surfboard carrier through section 5—5 of FIG. 2.

Referring to FIGS. 2, 3 and 5, the first U-shaped member 10 has an upper attachment end 20 and a lower attachment end 22. Similarly, the second U-shaped member 12 also has an upper attachment end 24 and a lower attachment end 26. The upper attachment ends 20 and 24 may be of any desired configuration for being attached to an upper portion of a bicycle 30 and the lower attachment ends 22 and 26 of the U-shaped members 10 and 12 may be of any desired configuration for attachment to a lower portion of the bicycle 30. Hence, when the respective upper and lower attachment ends are coupled to the upper and lower portions of the bicycle respectively, the U-shaped members 10 and 12 will extend rearward of but opening toward the bicycle.

In the preferred embodiment, the U-shaped members are positioned on opposite sides of a rear wheel 32 (FIGS. 1 and 2) with each of the lower attachment ends 22 and 26 of the U-shaped members 10 and 12 having a hole therethrough for being bolted onto the rear axle 34 of the bicycle rear wheel 32. Thus, the lower attachment end 22 will be attached to the axle 34 on one side of the rear wheel 32 and the lower attachment end 26 will be attached to the axle 34 on the opposite side of the rear wheel 32.

In the preferred embodiment, the upper attachment ends 20 and 24 are brought together and inserted between two legs 38 and 40 of a bracket 42 which is positioned around a seat support post 36 of the bicycle 30. Holes are provided through the upper attachment ends 20 and 24 and through the bracket legs 38 and 40 with a bolt 44 inserted therethrough for holding the surfboard carrier to the upper portion of the bicycle.

Of course, it will be appreciated that any other appropriate attachment mechanism may be utilized. For example, the lower attachment ends need not be attached to the axle 34 of the rear wheel 32 but may instead be attached to a rear frame 31 of the bicycle 30.

The first lower cross member 16, the second lower cross member 18, and the portions of the U-shaped members 10 and 12 between the first lower cross members 16 and the second lower cross member 18 define a generally rectangular lower retention region 46 (FIGS. 4 and 5) through which the nose end 52 of a surfboard 50 is inserted.

The upper cross member 14 and the portions of the U-shaped members 10 and 12 extending rearwardly from the upper cross member 14 define a generally U-shaped upper retention region 48 (FIG. 3) in which a central region 54 of the surfboard 50 is positioned.

In the preferred embodiment, the length of the lower rectangular retention region 46 between the first lower cross member 16 and the second lower cross member 18 is less than the width of the surfboard at a location on the surfboard close to its nose so that when the nose of the surfboard is inserted into the lower retention region 46, it will wedge between first and second lower cross members 16 and 18 for holding the nose of the surfboard above the ground. Hence, the distance between the nose of the board and that portion of the board having a width equal to the distance between the first cross member 16 and the second cross member 18 must be less than the distance between the lower retention region 46 and the ground.

In addition, in the preferred embodiment, the upper cross member 14 is positioned forward of the lower cross members 16 and 18. Thus, when the nose 52 of the board 50 is inserted through the lower retention region 46 and the central region 54 of the surfboard 50 is inserted between the U-shaped members 10 and 12 with one edge of the surfboard adjacent to the upper cross member 14, the rear or skag end of the surfboard opposite the nose end will be tilted forward. This forward tilting allows the center of gravity of the surfboard to be positioned generally over the rear wheel 32 of the bicycle to thereby allow the bicycle rider to retain greater control and balance while carrying a surfboard in the surfboard carrier.

Finally, an elastomeric material such as polyurethane foam tubing 62 is positioned around the U-shaped members 10 and 12 and the cross members 16, 18 and 14 in the lower rectangular retention region 46 and in the upper U-shaped retention region 48. The polyurethane foam covering serves two principal functions. First, it protects the surfboard from damage which may be caused to the board when it comes in contact with the hard surfaces of the cross members 14, 16 and 18 or U-shaped members 10 and 12. In addition, the polyurethane foam provides a means of holding the board substantially immovable both side-to-side and back-and-forth in the lower retention region 46 and substantially immovable side-to-side in the upper retention region.

In order to perform this gripping function, the width of the upper retention region 48 and the lower retention region 46 without the polyurethane foam 60 is provided to be greater than the maximum thickness of the surfboard while the width of the upper retention region 48 and the lower retention region 46 when the polyurethane foam is in place is provided to be less than the thickness of the surfboard 50. Hence, when the surfboard is placed in the upper and lower retention regions, the polyurethane foam will be compressed outwardly (FIG. 5) to thereby exert a resilient holding force against the surfboard.

It will be appreciated that various details may be changed without departing from the spirit of the present invention. For example, in another embodiment of the invention, a U-shaped upper retention means and a lower rectangular retention means may be separately provided with each being interconnected to the bicycle by a single attachment rod. The upper and lower retention means may then be bolted or welded to the bicycle in an appropriate manner. In such an embodiment, the lower attachment means may be coupled to only one side of the bicycle rather than both sides as previously disclosed for the preferred embodiment.

Hence, while particular embodiments of the invention have been shown and described, it will be obvious to those skilled in the art that changes and modifications can be made without departing from the invention in its broader aspects. The aim of the appended claims, therefore, is to cover all such changes and modifications as fall within the true spirit and scope of the invention.

What is claimed is:

1. A surfboard carrier for bicycles comprising:
a pair of U-shaped members extending rearward of and opening toward the bicycle for being positioned on opposite sides of the rear wheel of the bicycle, each U-shaped member having an upper attachment end for being attached to an upper portion of the bicycle and a lower attachment end for being attached to a lower portion of the bycicle;
first and second cross members attached between the pair of U-shaped members at spaced locations rearward of the bicycle for defining a lower, generally rectangular, retention region;
a third cross member attached between the pair of U-shaped members at a location above the first and second cross members for defining an upper, generally U-shaped, retention region opening away from the bicycle, wherein the third cross member is forward of the first and second cross members for positioning the upper U-shaped retention region forward of the lower rectangular retention region for holding the surfboard with its nose end down and its skag end tilted forward for positioning the center of gravity of the board generally over the rear wheel of the bicycle;

first elastomeric holding means attached about the inside of the lower retention region for simultaneously pressing against a top and an opposite bottom surface region and opposite edge regions about a nose end peripheral portion of the surfboard for holding the nose end peripheral portion substantially immovable side-to-side and back-and-forth; and second elastomeric holding means attached about the inside of the upper retention region for pressing against a top and opposite bottom surface region at a central portion of the surfboard for holding the surfboard at the central portion substantially immovable side-to-side.

2. The surfboard carrier of claim 1 wherein the length of the lower retention region is less than the width of the surfboard at a selected distance from the nose end of the surfboard for holding the nose of the surfboard above the ground.

3. A bicycle surfboard carrier for mounting a surfboard with a rear portion, a tapered nose, and a surfboard center portion to the bicycle, comprising:

lower retention means for defining a lower enclosed retention region for receiving the tapered nose of the surfboard therethrough and wedging the tapered nose of the surfboard therein;

lower attachment means for interconnecting the lower retention means to the bicycle rearward thereof;

upper retention means for defining an upper U-shaped retention region opening away from the bicycle;

upper attachment means for interconnecting the upper retention means to the bicycle, the upper retention region being positioned forward of the lower retention region, the upper and lower retention regions aligned for wedging the tapered nose of the surfboard through the lower retention region and further wedging the surfboard center portion in the upper retention region for tilting the rear portion of the surfboard forward toward the bicycle;

first elastomeric holding means attached about the inside of the lower retention region for simultaneously pressing against a top and an opposite bottom surface region and opposite edge regions about a nose end peripheral portion of the surfboard for holding the nose end peripheral portion substantially immovable side-to-side and back-and-forth; and second elastomeric holding means attached about the inside of the upper retention region for pressing against a top and opposite bottom surface region at a central portion of the surfboard for holding the surfboard at the central portion substantially immovable side-to-side.

4. The surfboard carrier of claim 3 wherein the length of the lower retention region is less than the width of the surfboard at a selected distance from the nose end of the surfboard for holding the nose of the surfboard above the ground.

* * * * *